May 29, 1962 P. M. GRANT 3,037,199
THIN FILM SWITCHING CIRCUIT
Filed Sept. 14, 1959
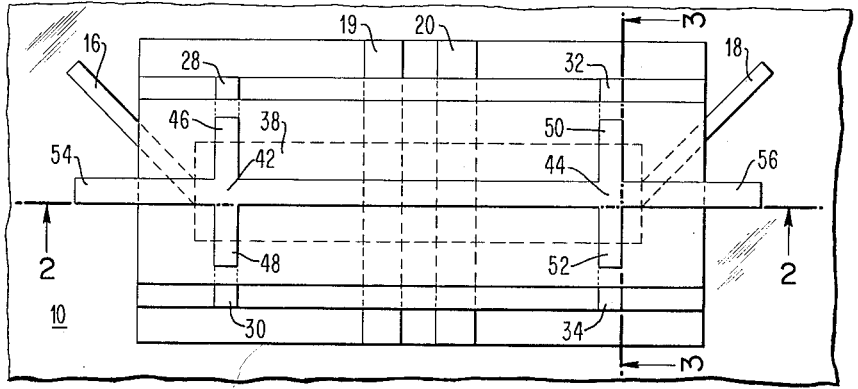
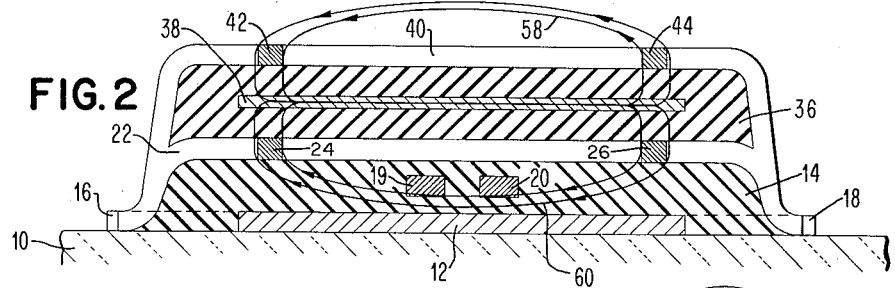
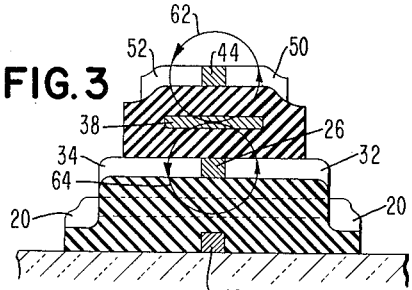 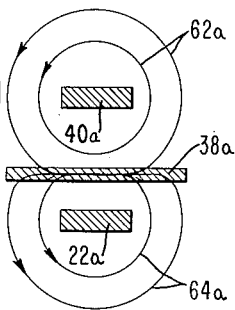
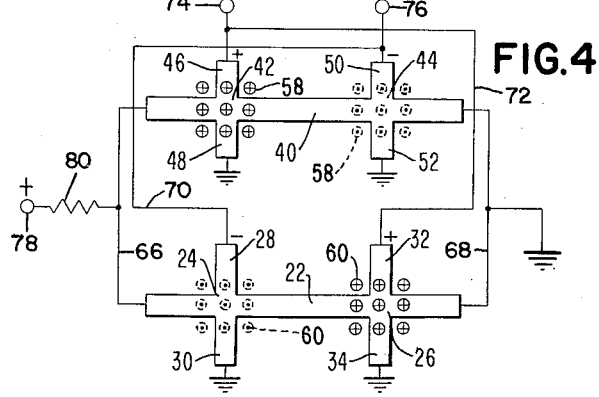
INVENTOR.
PAUL M. GRANT
BY *Frederick D. Poag*
ATTORNEY

United States Patent Office

3,037,199
Patented May 29, 1962

3,037,199
THIN FILM SWITCHING CIRCUIT
Paul M. Grant, Poughkeepsie, N.Y., assignor to International Business Machines Corporation, New York, N.Y., a corporation of New York
Filed Sept. 14, 1959, Ser. No. 839,632
7 Claims. (Cl. 340—174)

This invention relates to Hall effect devices and more particularly to an improved Hall effect circuit employing a thin film memory element.

Although the Hall effect has been long known, little practical use has been made of this principle because of inherent limitations as to voltage and power capabilities of devices of this kind. However, this effect lends itself very well to employment in so-called thin film devices wherein the power and voltage signal requirements of systems employing such thin film elements permit, and indeed may be limited to, signals of relatively small amplitude. At the same time the Hall probe element is well adapted to miniaturization and lends itself well to incorporation in thin film type devices while preserving the characteristics of small size and reliability found and demanded in devices of this kind.

In accordance with the present invention a device is provided which employs a thin nickel iron film of the kind which has uniaxial anistropy, i.e., two diametrically opposite easy directions of magnetization, as the primary flux source for operation of the Hall device, together with suitable drive means for reversing the magnetization of the thin film whereby it becomes a memory device which can be read by operation of the Hall probe. In devices of this size and kind, the flux generated by the Hall probe energizing line becomes a factor in disturbing the main fields of the thin film. For example, if the energizing line is parallel to the easy axis of the thin film, then the field of this energizing line is transverse to the main field and tends to warp the same in such manner that the effective poles of the thin film are dislocated and, more seriously, this flux has the tendency toward permitting the thin film to break up into individual magnetic domains in a manner to upset its preferred axis as originally manufactured.

It is, accordingly, a feature of this invention that the Hall probe energizing means is provided in the form of a parallel pair of lines embracing the thin film in such manner as to provide mutual cancellation of field components arising from the energizing currents. In the preferred embodiments of the invention this doubling of the probe energizing lines is attended by doubling of the output capability of the device, and, with employment of both poles of the thin film, the device provides four outputs which may be employed in various ways to increase the output amplitude and/or variety available from the device. At the same time, the cancellation of cross fluxes provided enables increasing the Hall probe energizing line currents to the temperature limits of the device without the undesirable effects from cross fields above noted.

In the operation of thin film memory devices, switching of the polarity of the memory film is facilitated by the provision of a certain amount of cross flux during the switching procedure. In prior devices a bias line has been provided to supply cross flux for this purpose. However, in accordance with a preferred embodiment of the present invention, the aforementioned cancellation of the cross fluxes which arise from the Hall probe energizing lines is made deliberately less than perfect so that some net cross flux remains which can be employed to facilitate switching of the thin film memory element in lieu of the more usual bias line for this purpose.

Accordingly, a major object of the invention is to provide an improved Hall effect device employing a thin film ferro-magnetic element in its main flux circuit.

Another object of the invention is to provide a device as aforesaid wherein undesirable influences of the fields set up by the Hall probe energizing currents are minimized.

Still another object of the invention is to provide an improved device as aforesaid wherein, as an added result of the structure providing the aforementioned flux cancellation, there is provided an improvement in output amplitude capacity as well as in capability for providing a plurality of outputs of the mutually exclusive signs simlar to the outputs of a so-called "flip-flop" circuit.

A further object of the invention is to provide an improved Hall effect device as aforesaid wherein the Hall element energizing means is adapted to provide a controlled net amount of cross flux for aiding the switching of a ferro-magnetic thin film memory element associated therewith.

Still another object of the invention is to provide an improved device as aforesaid which is durable and reliable and may be manufactured with facility despite its subminiature dimensions.

Other objects of the invention will be apparent from the foregoing discussion, from the following detailed description, from the appended claims, and from the drawings wherein:

FIG. 1 is a plan view of a thin film switching device in accordance with the invention;

FIG. 2 is a sectional view taken about along line 2—2 of FIG. 1;

FIG. 3 is a sectional view taken about along line 3—3 of FIG. 1;

FIG. 3a is a fragmentary, schematic view similar to portions of FIG. 3 but showing a modified embodiment of the invention; and FIG. 4 is a schematic diagram of an apparatus employing the device of FIG. 1, and applicable also to utilization of the modification indicated in FIG. 3a, in accordance with the invention.

In FIGS. 2, 3, and 3a the vertical dimensions, as seen in those figures, are greatly exaggerated for clarity of illustration.

Referring more particularly to the drawings, a preferred embodiment of the invention may comprise an assembly providing a core bias line, main core switching means, a first Hall probe configuration, a core element, a second Hall probe configuration, and intervening insulator material, as illustrated in FIGS. 1–3. As shown in those figures the device may be built up in sandwich fashion, by evaporation techniques for example, on a suitable substrate such as a sheet of quartz glass 10, the first layer on the glass including a chrome copper or other suitably conductive core bias line 12, over and around which there is deposited a first portion of a layer 14 of suitable insulating material such as silicon monoxide. As shown, the bias line 12 has integrally formed contact portions 16, 18 extending beyond the insulator body 14. Next to be deposited are core switching means preferably comprising, as shown, a pair of lines 19, 20, following which the remainder of the insulator layer 14 is laid down, over and around these elements. Over this, there is deposited a ribbon of material which exhibits a suitable Hall effect, such as indium antimonide, which serves as a Hall element energizing line 22 having a pair of Hall element forming portions 24, 26 therein, and which, further, is formed with laterally extending or cross arm elements 28, 30, 32, 34 serving as leads to the Hall junctions at the edges of the energizing line. Next in the circuit device structure is the first portion of another layer 36 of insulating material such as silicon monoxide over which there is deposited a ferro-magnetic memory element 38 serving as a core element for the device. Over and around the core element is deposited the remainder of the insulator 36, after which a final deposition of a suitable Hall element forming material, such as indium antimonide, is laid down having shape and orientation companion to the first described Hall element containing layer. Thus, the final layer includes a Hall element energizing line portion 40, Hall element parts 42, 44 and laterally extending lead arm portions 46, 48 and 50, 52 for the respective Hall elements in this ribbon of semi-conductor material.

As shown in FIGS. 1 and 3, the various layers of the device may be formed in stepped-back fashion to expose the end portions of the core switching lines 19, 20 and the various Hall element output leads 28, 30, 32, 34, 46, 48, 50, and 52 for attachment to external circuit lines in any convenient manner, for example, by means of spring contacts (not shown). Similarly the energizing line 22 of the lower Hall element containing structure may be carried beyond the ends of the sandwich structure to form contact portions 54, 56 which, together with the aforedescribed bias line leads 16, 18 are supported by the substrate 10 in position for connection to external circuitry by spring contacts or any other convenient means.

It will be understood that the energizing line 40 of the upper Hall probe containing ribbon could be provided with independent leads where desired; for example, this energizing line 40 could be carried out of the ends the sandwich structure in laterally displaced manner similarly to the contacts 16, 18 of the bias line 12. However, where powering of the two energizing lines 22, 40 is to be from the same source in an electrically parallel circuit arrangement it is preferred, for convenience, to join these two lines within the structure of the device, as in the illustrated embodiment of the structure. Thus the upper energizing line 40 is brought over the ends of the insulator material 36 upon which it is supported and joins with the lower energizing line 22 for connection to the common terminals 54, 56 as shown so that the two lines are electrically, as well as physically, in parallel.

It will be appreciated that although the insulator material 14, 36 has been numbered and shown in two sections for convenience of illustration, it is actually laid down in several layers for permitting the deposition of the various elements 19, 20, 22, and 38 which are buried in it, and that as finally deposited, the insulating material merges into a single mass which suports and maintains the various other parts of the sandwich structure thus fabricated in their desired spaced and relatively oriented positions.

The core switching drive lines 19, 20 comprise means for setting up flux in the core 38; however, in the preferred illustrated embodiment of the invention these means 19, 20 are employed merely to switch the magnetic polarity of the element 38, and the field which is shown at 58, 60 and employed to provide flux through the Hall elements 24, 26, 42, 44 of the device arises from the residual magnetism of the core element 38 after it has been placed in the desired magnetic condition by the lines 19, 20 and those lines 19, 20 have been de-energized. Thus the core element 38 is, in the preferred embodiment of the device, a memory element, the state of which determines the polarities of the Hall voltages generated when currents are passed through the energizing lines 22, 40 in a given direction.

Preferably, the core element 38 is a very thin uniaxially anisotropic magnetic film, that is, one having dynametrically opposite "easy" directions of magnetization whereby the element has a preferred substantial degree of residual magnetism in either of the directions along the easy axis and may be switched rapidly to the opposite direction; in other words, it is capable of assuming two different stable states of residual magnetization, with poles oriented to provide the flux 58, 60 or the opposite of that flux direction, according to the direction of the residual magnetization remaining after the previous core switching operation.

The preferred uniaxial anisotropic magnetic element 38 employed in this invention is a thin magnetic film shaped as is shown having a composition of approximately 83 percent nickel and 17 percent iron. The material is evaporated or otherwise deposited in place in a high vacuum ($10^{-6}$ mm. Hg), to a thickness of approximately 2,600 Angstroms in the presence of a magnetic field such that the deposited material has a uniaxial anisotropic characteristic, i.e., a single axis of easy magnetization along which magnetic moments of the material tend to lie. The preferred direction of magnetization of the film is then the resultant direction along which all of the magnetic moments within the film tend to align themselves.

Switching the state of the film 38 from one polarity to the other may be accomplished by applying a field parallel to the "easy" axis, such as the field of current flowing through one or both of the core switching lines 19, 20, and, preferably at the same time applying a second field parallel to the plane of the film 38 and transverse to the easy axis of the film, such as by the passing of current through the bias line 12. The second field applies a torque to all the moments within the element 38 to start rotation of the moments in the plane film. Under the influence of this field the moments of the element 38 could rotate to a maximum of 90° with respect to a preferred direction of magnetization along the easy axis. With the combination of the field parallel to the easy axis, applied in coincidence with the transverse field and directed toward reversal of the state of the element 38, the moments continue to rotate toward the reversed stable state of the film, and tend to stay in that state after the reversing fields have been removed.

It should be noted that in the preferred structural arrangement of the invention, not only the core element 38 but also the other elements of the device are deposited in the form of very thin layers. By this means, the various elements are brought very close together for effective operation by even very weak fields. For example, the insulation thicknesses between the various conductive parts is desirably in the order of one to a few thousand Angstroms and the conductor and semi-conductor parts are also very thin, for example, in the order of ten thousand Angstroms.

Referring to FIG. 3, it will be seen that when energizing currents are passed through the Hall element containing lines 22, 40, magnetic fields as indicated at 62, 64 in FIG. 3 are set up about those energizing lines. As indicated in that figure, if the energizing lines 22 and 40 are equally spaced from the core element 38 and in parallel embracing relation thereto, then the two fields 62, 64 set up by these energizing lines will exactly cancel in their effect on the core element 38. Thus very high energizing currents may be employed in operation of the Hall elements without undesired warping of the residual field of the core element.

Referring now to FIG. 3a, in one preferred embodiment of the invention, the Hall element energizing lines 22a, 40a are intentionally placed at unequal distances from the core element 38a of the device so that there is imperfect cancellation of the fields 62a, 64a transverse to the easy axis of the element 38a, arising from currents through the Hall element energizing lines. Accordingly, a small net cross flux results which may be employed as a transverse field to aid in the switching of the core 38a as aforedescribed. Since the transverse field may be in the order of only 1 percent of the field parallel to the easy axis required to switch the magnetic state of the core element, this difference in flux between the fields 62a and 64a does not present an unduly warping force in ordinary operation of the device. It will be understood that except for the deliberately unequal spacing of the parts illustrated in FIG. 3a, all other parts of the device as aforedescribed in relation to FIGS. 1–3 remain the same in the modified embodiment of FIG. 3a with the exception that the bias lines 12 as shown in FIGS. 1–3 may in most cases be eliminated.

Referring now to FIG. 4, a typical employment of the structure shown in FIGS. 1–3 is illustrated. In this schematic figure the respective Hall element containing parts 22, 40 are shown laterally displaced for clarity of illustration, and the fluxes 58, 60 of the residual fields of the core element are indicated by conventional symbols as shown. That core element is shown at 38 in FIGS. 1–3 but is omitted in FIG. 4, for clarity. As set forth above, the Hall element energizing lines 22, 40 are connected in parallel by the structure of the preferred form of device as illustrated in FIG. 3; this parallel connection is indicated in the electrical-magnetic schematic of FIG. 4 by the lines 66 and 68 shown therein.

In the illustrated arrangement, the Hall elements are connected in two parallel groups by lines 70 and 72 for the furnishing of positive and negative voltages respectively at output terminals 74, 76 of the circuit arrangement during the time that the Hall element energizing lines 22, 40 are carrying current from left to right as seen in that figure, using conventional current notation, as the result of the application of a positive voltage at terminal 78 which is connected as shown through a protective resistor 80 to the two energizing lines 22, 40. It will be appreciated that if the polarity of the core or memory element 38 is reversed from that indicated in the drawing (or if the voltage applied at the energizing terminal 78 is reversed) the result will be a reversal of the voltages available at the output terminals 74, 76. Accordingly, the device has attributes similar to a so-called "flip-flop" circuit in that it has two outputs which are mutually exclusive in sign and may be reversed upon the application of an appropriate input signal, in this case on one or both of the core reversing or switching lines 19, 20. In the preferred embodiment illustrated two such switching lines are shown, primarily for convenience in cooperating circuitry (not shown), so that a single one of such lines can be used always in a single polarity for effecting switching of the core element 38 in a corresponding direction; it will be understood that one or any number of such lines could be employed, depending on such external circuitry. It will be seen further that, in addition to being a flip-flop-like device, the device has a memory function whereby it will respond in accordance with its previously switched magnetic state without maintenance of signals of any kind during the interim.

When the modified embodiment indicated by FIG. 3a is utilized, the voltages generated in the Hall elements will be slightly different in value in proportion to the difference in flux from the element 38 which reaches and penetrates the Hall elements unequally spaced therefrom. However, since the difference in this spacing may be actually quite minor, it being, as stated above, unnecessary to have a strong transverse flux for aiding the core switching operation, the currents can in most cases be utilized in parallel as illustrated in FIG. 4, for increasing the current capacity of the device, since there will be, of course, some voltage drops in the lead portions 28, 30, 32, 34 and 46, 48, 50, 52 of the Hall element forming members which will operate to equalize the voltages in the parallel combination. In this regard, where unequal distances of the Hall probe elements from the memory element 38 are employed, as shown in FIG. 3a, it is preferred that the greater distance between the upper Hall element forming part and the memory element, whereby the shorter lead arms 46, 48, 50, 52 of that part in the configuration shown operate, having lower resistance, to offset the slightly lesser Hall voltages generated.

It will be understood that the device of FIGS. 1 and 3 or 3a may be employed in a variety of manners other than shown in FIG. 4; for example the energizing lines of the Hall element containing layers can be electrically isolated as above noted, and the voltages may be employed additively, or the voltages can be utilized individually.

From the foregoing it will be appreciated that the present invention provides a solid state device, having the durability and reliability associated with such devices, which maintains a particular circuit switching condition indefinitely and may be read at any time in a manner which is non-destructive of the memory even where intense energizing current pulses are utilized, and which may be switched at will to reverse its output. Accordingly, the device has utility in employments similar to those of flip-flop circuit and at the same time has a memory attribute which may be employed even after periods of disuse.

While there has been shown and described and pointed out fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A device comprising residually magnetized thin magnetic film means, first current carrying means oriented in the field of said magnetized means and comprising a Hall probe element and means defining a first current path to convey energizing current for said element through said element, and second current carrying means defining a second current path, said second current path being oriented with respect to said first current path and said magnetized means to provide in conjunction with said first current path field components which are mutually cancelling within said magnetized means when currents of predetermined relative directions are passed through said paths, and circuit means connected to said first and second current carrying means and adapted to supply said currents thereto in said predetermined relative directions.

2. A device comprising residually magnetized thin magnetic film means having pole means, first current carrying means oriented in the field of said pole means and comprising a Hall probe element and means defining a first current path to convey energizing current for said element through said element, second current carrying means defining a second current path, said current path being oriented to be parallel to each other and in embracing relation to said magnetized means and circuit means connected to said first and second current carrying means and adapted to pass currents through said paths in the same direction whereby said currents set up field components which are mutually cancelling within said magnetized means.

3. A device in accordance with claim 2, wherein said magnetized means has an easy axis of magnetization which is parallel to said current paths.

4. A device in accordance with claim 2, wherein said magnetic film has an easy axis of magnetization which is parallel to said current paths, and wherein the fields set up by said current paths have a net value in the plane of said film and are orthogonal to said axis, and means to apply a field coincident with said axis to switch the residual magnetism of said film.

5. A device in accordance with claim 2, wherein said magnetized means has an easy axis of magnetization which is parallel to said current paths, and wherein said second current carrying means comprises a second Hall probe element disposed within the field of said pole means, and wherein said second current path constitutes means to convey energizing current for and through said second Hall probe element.

6. A device comprising residually magnetized thin magnetic film means having an easy axis of magnetization with pole means at each end thereof, first and second current carrying means oriented in parallel embracing relation to said easy axis and each comprising a Hall probe element in the field of each said pole means and each defining a current path to convey energizing current for said Hall probe element through respective pairs of said elements, and circuit means connected to said first and second current carrying means and adapted to pass currents through said paths in the same direction whereby said currents set up field components which are mutually cancelling within said magnetized means.

7. A flip-flop device comprising thin magnetic film means having an easy axis of magnetization, first and second current carrying means oriented in the field of said film means and each comprising a Hall probe element and means defining a current path to convey energizing current for said element through said element, said current paths being oriented to be parallel to each other and to said axis and in embracing relation to said film means, circuit means connected to said first and second current carrying means and adapted to pass currents through said paths in the same direction whereby said currents set up field components which are mutually cancelling within said film, means for switching the polarity of said film, and separate output circuits for said Hall probe elements.

References Cited in the file of this patent

UNITED STATES PATENTS 2,914,728     Brophy _____ Nov. 24, 1959

FOREIGN PATENTS 1,139,314     France _____ June 27, 1957

OTHER REFERENCES

"A Compact Coincident-Current Memory" by Pohm and Rubens, "Proceedings of Eastern Joint Computer Conference," Dec. 10–12, 1956, pp. 120 to 123.